Oct. 30, 1951     M. J. P. BOGART ET AL     2,573,244
RECOVERY OF PHENOL FROM DILUTE AQUEOUS SOLUTIONS

Filed April 6, 1949

INVENTORS
Marcel J. P. Bogart &
BY Austin S. Brunjes
Nathaniel Ely
ATTORNEY

Patented Oct. 30, 1951

2,573,244

UNITED STATES PATENT OFFICE 2,573,244

RECOVERY OF PHENOL FROM DILUTE AQUEOUS SOLUTIONS

Marcel J. P. Bogart, Mamaroneck, and Austin S. Brunjes, Plandome, N. Y., assignors to The Lummus Company, New York, N. Y., a corporation of Delaware Application April 6, 1949, Serial No. 85,816

8 Claims. (Cl. 202—68)

This invention relates to improvements in the production of concentrated phenol and particularly to the recovery of concentrated phenol from dilute aqueous solutions. It is a continuation-in-part of our copending application Serial No. 592,954, now abandoned, filed May 10, 1945 which is a continuation-in-part of application Serial No. 447,982, filed June 22, 1942, now abandoned both of said applications being entitled Recovery of Phenol.

Aqueous phenol solutions containing from traces of phenol to saturation concentrations are found in the recovery and reworking of tars and ammoniacal liquors in gas manufacture and coke oven operations, solvent refining of lubricating oils, separation of close boiling hydrocarbons by azeotropic distillation, manufacture of synthetic phenol and other industrial operations. In the monochlorbenzene process for manufacture of phenol for example, a phenol-water-salt mixture containing in the order of 5 to 8 weight percent phenol is obtained; such a mixture must be treated to recover the salt for reuse in the system as well as to recover the phenol to increase the efficiency of the process and to avoid creating objectionable waste. The strong toxicity of phenol, even in concentrations measured in parts per million, makes the rejection of dilute phenol an important waste disposal problem.

Separation of the phenol from dilute aqueous mixtures by normal distillation methods is precluded by adverse vapor-liquid equilibrium relationships in the usual commercial range of operating temperatures and pressures. Furthermore, due to the mutual solubility of phenol and water with the formation of an azeotrope very low in phenol concentration, it is substantially impossible to commercially obtain concentrated phenol from water solutions by simple liquid phase separation.

Recourse has also been had to the use of liquid-liquid extraction and while this does not eliminate the necessity of distillation operations, somewhat more favorable conditions are obtained for the separation of phenol from the water. However, fairly complete removal of phenol by extraction is also difficult by reason of the relatively high mutual solubility of phenol and water.

The principal object of our invention is to economically recover a concentrated phenol solution from dilute aqueous mixtures using extractive distillation in such a manner that it is possible to use simple distilling equipment.

A further object of the invention is to carry out a synthetic phenol production process in such a manner that the dilute aqueous phenol intermediate product can be completely recovered.

A further object of the invention is to recover from a water-phenol solution, having less than the azeotropic concentrations of phenol in water, a vaporous mixture having substantially higher than normal azeotropic concentrations of phenol so that on condensation a yield of azeotropic concentrations of water in phenol are obtained for ultimate purification.

Further objects and advantages of our invention will appear from the following description of preferred forms of embodiment thereof taken in connection with the attached drawing illustrative thereof and in which.

Figure 1:
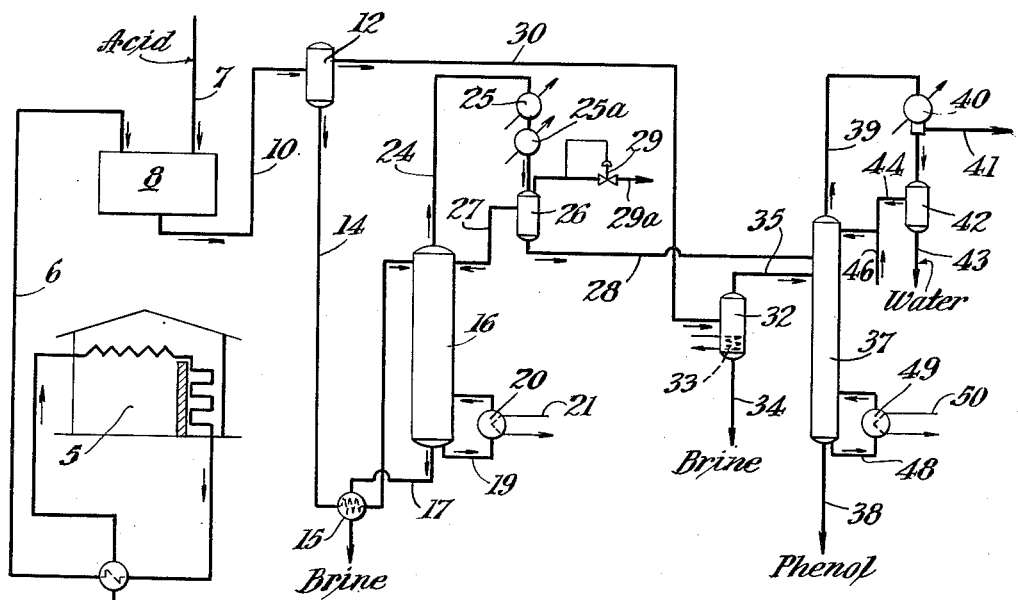
Fig. 1 is a flow diagram of a part of a continuous synthetic phenol plant.

Our invention is primarily adapted to improve the efficiency of yield of the monochlorbenzene process for producing phenol. In such a process, a caustic mixture in line 2 and monochlorbenzene mixture in line 3 are pumped under pressure through line 4 into reactor 5 which is preferably in the nature of a tube still. The reaction products largely consisting of sodium phenate are discharged through line 6. The composition of the stream 6 will vary radically however, depending upon the feed and the conditions existing in the reactor 5. In general, the probable theoretical reaction is as set forth in the United States patent to Aylsworth 1,213,142.

$$C_6H_5Cl + 2NaOH = NaCl + C_6H_5ONa + H_2O$$

In the above patent it was suggested that for every mol. of chlorbenzene, 2¼ mols. of caustic with only 15 to 25 mols. of water should be used. The composition of the caustic on the chlorbenzene free basis is then nearly 21% and it is found that serious side reactions take place in the reactor. This is objectionable not only because of the problem of coking but also due to the low yields of the sodium phenate.

Further studies of the reaction indicate that a maximum yield of phenol is obtained with 10% caustic and in such case the objectionable tar production is only approximately 1%. With recycling, the diphenylether yield may be suppressed and in such case, a somewhat stronger caustic may be used without completely dropping the efficiency of operation. Typical yields are as follows:

| Caustic | Phenol | Diphenyl-ether | Tars |
|---|---|---|---|
| 5% | 93.6 | 4.7 | 1.7 |
| 10% | 96.0 | 3.0 | 1.0 |
| 20% | 91.0 | 5.7 | 3.3 |
| 30% | 84.0 | 6.1 | 9.0 |

In accordance with our invention it is essential that the yields of sodium phenate be the maximum compatible with troublefree operation. This is accomplished by concentrating an electrolytic caustic-salt solution to approximately 20% NaOH and 10% NaCl and then by dilution, obtaining a suitable feed of 10% NaOH with 5% NaCl, the balance being water.

The sodium phenate effluent at 6 is then "sprung" by mixing hydrochloric acid at 7 in tank 8 to produce a water-salt-phenol mixture in line 10. This phenol effluent has a concentration of around 6.0 weight percent phenol and 15.5 weight percent salt, and settles in tank 12 in two layers the upper of which is approximately 85.2 weight percent phenol and 14.8 weight percent water. The lower layer consists of about 2.21 weight percent phenol and 16.49 weight percent NaCl, the balance being water.

The upper concentrated phenol layer which is removed in line 30 may be taken directly to a final dehydration step if it contains no salt, or it may be passed through an evaporator 32, heated by steam coil 33, to produce a substantially salt free concentrated phenol-water solution overhead, passing through line 35 to the dehydrating column 37; a small amount of phenol-free brine being removed at 34.

Our invention is particularly concerned with the concentration of the dilute water-salt-phenol layer which is removed from the lower part of settler 12 through line 14. It is, of course, known that phenol and water can be removed by distillation to leave the salt free of phenol but the azeotrope of phenol-in-water has a maximum concentration of about about 9 weight percent of phenol at atmospheric conditions. Even with high reflux ratios or pressures as high as four atmospheres, the further dehydration of phenol becomes very costly.

It has, of course, been noted that the non-ideality of binary mixtures increases with decreasing mutual solubilities of the two components and that the addition of non-volatile solids to these mixtures enhances the relative volatility of the components by increasing their relative deviation from the ideal solution laws through a further decrease in mutual solubility. Studies of the use of pressure alone on phenol-water solutions were not encouraging. It was also known that high concentration of caustic which would give a high salt yield, would cause undue polymerization in the reactor 5 and it was also realized that high salt yields in the continuous fractionating column 16 would tend to crystallize out on the decks to the detriment of the operation.

Effective production of a phenol rich overhead vapor can be accomplished by our invention however, without other operating difficulties if the dilute phenol solution of line 14 is treated more nearly as an "extractive" distillation than as simple distillation. This is accomplished, not only by the use of pressure and the maintenance of a minimum salt concentration, but by introducing the feed, with the brine to the top deck of the stripper. As a result, the overhead has a greater phenol concentration than can be separated by any other known means. As a result, the reflux ratios are low and difficulties which otherwise arise from increased solubility ratios are avoided.

More specifically, the brine stripper 16 is operated under conditions to drive all the phenol overhead and leave a phenol free brine having of the order of .01 weight per cent phenol contamination to minimize interference with the electrolytic cells. This is accomplished with a bottoms temperature of about 250° F. Preferably, to avoid dilution, the high pressure steam (at 180 p. s. i. g.) is supplied by indirect heat exchange in line 21 to heat exchanger 20 which is in reboiler circuit 19. Advantage is of course taken of the hot brine draw off in line 17 to preheat the feed of line 14 in heat exchanger 15.

The overhead vapor from the stripping tower 16 consist only of phenol and water and are removed through line 24. They are condensed in a steam generator 25 using boiler feed water as the cooling medium. This exchanger feeds low pressure steam (15 lbs./sq. in.) to an exhaust steam header (not shown). The phenol-water condensate is then sub-cooled in exchanger 25a and collected in a decanter 25.

By operating in accordance with the hereinafter described method, the overhead vapors are richer in phenol than the normally saturated phenol-in-water concentration and the condensate will then settle in two layers. The upper or water-rich layer in this case is weaker than the azeotropic concentration of phenol-in-water, containing about 9 weight per cent of phenol. This layer is recycled through line 27 to the top of brine stripper 16. The lower layer is a phenol-rich layer containing approximately 69 weight per cent of phenol and is removed by line 28 to the dehydrating column 37.

Figure 2:
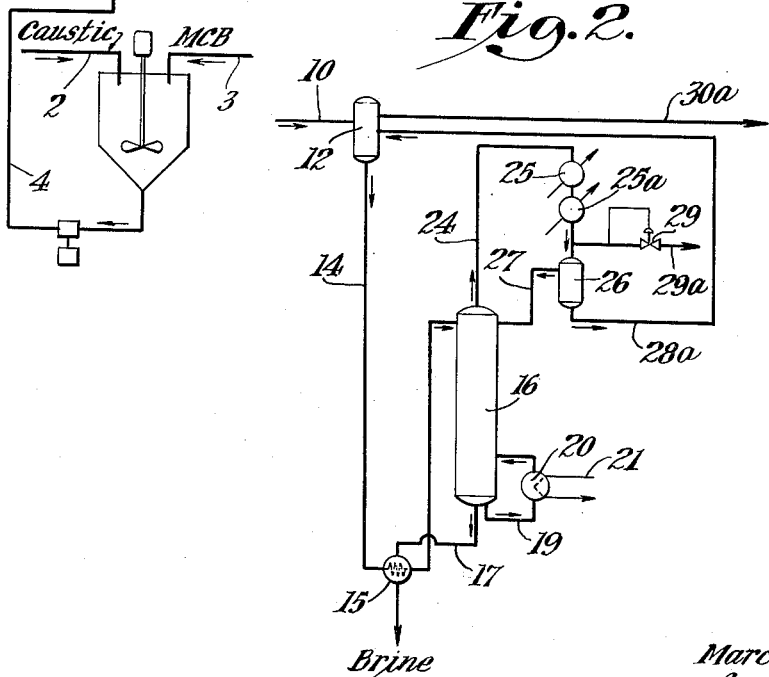
Fig. 2 is a modified flow diagram of a part of such plant.

Alternatively, the phenol rich layer may be returned to the first settler 12 as shown by line 28a in Fig. 2. This minimizes dilution of salt on the tower decks and lowering of the vapor-liquid equilibria. Advantage is also taken of the salt in the lower layer in settler 12 to aid in concentrating the phenol in the upper layer, with both materials passing simultaneously to final dehydrator 37 through line 30a. For example, an 85 weight per cent phenol is removed from the upper layer of decanter 12 when salt is present in the bottom whereas only 69 weight per cent phenol can be recovered when only water and phenol constitutes the other layer.

The particular operation of brine stripper 16 is an essential feature of our invention for it permits an automatic yield of substantial amounts of a phenol-rich layer containing about 69 weight per cent phenol instead of only a water-rich layer containing about 9 weight per cent phenol. It is, of course, essential that the amount of the phenol-rich layer be such that excessive reworking of the overhead is not required. We find for example that the lowest economical amount should be such that the recycle of the stream 27 should not be greater than 10 to 1 based on the phenol-rich product removed at 28.

Brine stripper 16, in accordance with our invention, is probably operated more nearly as an extractive distillation step than simple distillation. Not only is the brine as "extractive solvent" present on all plates of the tower so that advantage may be taken of the increased relative volatility of the components being fractionated in the presence of salt, but the water-phenol upper layer from decanter 26 is recycled to the top plate. Due to the presence of the sodium chloride of at least 15% concentration, and due to the return of about 9 weight per cent phenol solution, as well as due to the effect of operating at a super-atmospheric pressure of about four atmospheres, we get an overhead of about 3.4 mol. per cent phenol or 15.5 weight per cent. As a result, the ratio of layers in decanter 26 is about 1 to 9. It is desired that the phenol-rich layer be present to the extent of at least 10% of the total condensate. Pressure is conveniently maintained by the setting of pressure-control valve 29 in line 29a.

Salt concentrations in excess of 15% have been tried with some benefit and operations at 17% have been found even more effective. The limit of salt concentration is about 24% but this is impractical because of premature crystallization in the stripper 16. The practical working range of salt appears to be from about 15% to 20%. If less than 15%, the cost of recycle operations becomes prohibitive.

It also appears from our studies that pressures above atmospheric are desirable, not only to free the brine of phenol but to increase the phenol concentration in the overhead. It appears that a range of about 45 p. s. i. g. to 100 p. s. i. g. is most effective commercially.

The combined effect of the higher salt concentrations and higher pressures will increase the relative amount of phenol-rich layer in decanter 26 to the water-rich layer to a ratio in the range of one to four instead of one to nine.

Production of the anhydrous phenol from the relatively concentrated phenol is preferably accomplished in dehydrating column 37 in the presence of a water entraining agent such as toluene which acts as a dehydrating agent to produce dry phenol. This also has the advantage of lowering steam consumption as there is no phenol in the overhead product which would have to be recycled to some previous point in the system.

The dehydrating column 37 is provided with a desired number of fractionating decks to permit a separation between a salt-free, water-free phenol as a bottoms product in line 38 and a vapor overhead removed through the line 39. The vapor overhead is predominantly water together with the entraining agent and this mixture is condensed by the condenser 40 which is preferably operated under a vacuum applied through line 41. The condensate is settled in the tank 42 from which a water layer is removed at 43 and a reflux layer is returned to the column at 44. The entraining agent may be charged to the system through the line 46. The necessary heat for the column 37 may be supplied by the reboiler circuit 48 with the heating medium introduced to the heat exchanger 49 through the line 50.

As compared to normal practice, we find it possible by these steps to materially reduce the size of columns 16 and 37 and to reduce the steam consumption. In the following table, the advantage will appear by inspection.

|   | Pressure, Lb. Ga. | Wt. Per Cent NaCl | Diameter Tower 16 | Diameter Tower 37 | Steam per lb., Phenol |
|---|---|---|---|---|---|
|   |   |   | *Feet* | *Feet* | *Pounds* |
| A | 0 | 0 | 7.0 | 12.0 | 48.0 |
| B | 45 | 0 | 5.5 | 11.5 | 48.0 |
| C | 0 | 17 | 5.5 | 2.5 | 14.0 |
| D | 45 | 17 | 3.0 | 2.0 | 6.5 |

It will thus be seen that while we dilute the caustic used in the reaction, we undertake to have a salt concentration of at least 15% and as high as 20% in the effluent from the reactor. This is carried through the first separation by settling and is carried to the top of brine stripper 16 to assure the removal of a water-phenol vapor having at least 15 weight percent phenol. It is not necessary, and in our opinion undesirable, to remove salt from the reactor effluent before dehydration. In fact it is our opinion that the salt concentration at the top of stripper 16 should be at least 15 weight percent even if it is necessary to directly add salt to the feed to the brine stripper, as for example, in recovery of aqueous phenol solutions not having salt present.

In some waste recovery problems, for example, it may be found that there is no salt carried by the aqueous phenol mixture. In such case, the addition of sufficient salt to bring up the concentration to the 15% to 20% range will prove highly effective.

While we have shown and described preferred forms of embodiment of our invention, we are aware that modifications may be made thereto which we consider within the scope and spirit of our invention.

We claim:

1. The method of concentrating an aqueous phenol solution containing less than the azeotrope proportion of phenol at atmospheric pressure which comprises fractionally distilling said dilute phenol solution in a rectification zone heated by indirect heat exchange in the presence of sodium chloride brine in all parts of the zone and under a super atmospheric pressure of at least three atmospheres to produce a vaporous overhead of water and phenol containing substantially more phenol than the binary azeotropic proportions of phenol-water, condensing said vapors and settling said condensate for sufficient time to produce a saturated water-rich layer and a saturated phenol-rich layer, returning said saturated water-rich layer to the top of the rectification zone and withdrawing the saturated phenol-rich layer.

2. The method as defined in claim 1 in which an aqueous phenol brine solution having a phenol concentration of less than 6 weight percent is fed to the top of the rectification zone, in which the vaporous overhead of water and phenol is maintained at a minimum of 15 weight percent of phenol, and in which said vaporous overhead is condensed and cooled to below 100° F., whereby the saturated water-rich layer contains at least 69 weight percent of phenol and is present to the extent of at least 10% of the total condensate.

3. The method of recovering phenol from a phenolic sodium chloride brine mixture having not more than 9 weight per cent phenol which comprises feeding said mixture to the top of an indirectly heated rectification zone, fractionally distilling said mixture in said zone to produce a bottoms product comprising brine free of all but a trace of phenol and an overhead comprising a phenol-water vapor free of sodium chloride, maintaining a sodium chloride brine in all parts of said zone with a concentration of at least 15 weight per cent at the top thereof to establish a phenol concentration of at least 15 weight per cent, condensing said phenol-water distillate, settling said condensed phenol-water distillate to produce a phenol-rich lower layer and a water-rich upper layer, and returning said water-rich upper layer to the upper part of said fractional distillation zone as reflux.

4. The method of recovering phenol as claimed in claim 3 in which the distillation is carried out under at least three atmospheres of pressure.

5. The method of recovering phenol as claimed in claim 4 in which the reflux weight ratio is between 4 to 1 and 10 to 1 being the ratio of weight rate of flow of water-rich layer refluxed to the fractional distillation zone to the weight rate of flow of phenol-rich layer sent forward for final purification.

6. The method of recovering anhydrous phenol from a phenol-sodium chloride brine mixture resulting from the neutralization of sodium phenate with acid in a commercial monochlorbenzene synthetic phenol production process and in which the phenol-sodium chloride brine mixture is first settled to establish a phenol-rich upper layer and a brine-rich lower layer, the improvement which comprises feeding said brine-rich layer to the top of a rectification zone heated by indirect heat exchange, fractionally distilling the brine-rich layer in said zone to produce a bottoms product comprising brine with not more than a trace of phenol, maintaining a sodium chloride concentration of at least 15 weight per cent at the top of said zone to produce a phenol-water vapor overhead in which the phenol is present in at least 15 weight per cent, condensing said phenol-water distillate, settling said condensed phenol-water distillate to separate a phenol-rich lower layer from a water-rich upper layer, returning said water-rich upper layer to the top of the rectification zone as reflux, and dehydrating both of said phenol-rich layers by azeotropic distillation.

7. The method of recovering anhydrous phenol as claimed in claim 6 in which the last-mentioned phenol-rich lower layer is added to the first-mentioned phenol-rich upper layer in the first settling step, whereby the phenol content of said upper layer can be increased due to the presence of salt in the first settling step.

8. The method of recovering anhydrous phenol as claimed in claim 7 in which the distillation is accomplished in the presence of a salt concentration in the range of 15% to 20% and under a pressure in excess of three atmospheres and with a reflux ratio of the water-rich layer of less than 10 to 1.

MARCEL J. P. BOGART.
AUSTIN S. BRUNJES.

REFERENCES CITED

The following references are of record in the file of this patent:

UNITED STATES PATENTS

| Number | Name | Date |
|---|---|---|
| 1,213,142 | Aylesworth | Jan. 23, 1917 |
| 1,911,832 | Lewis | May 30, 1933 |
| 2,079,383 | Raeth | May 4, 1937 |
| 2,086,856 | Deiters et al. | July 13, 1937 |
| 2,096,871 | Atkins | Oct. 26, 1937 |
| 2,209,150 | Byrns | July 23, 1940 |
| 2,322,881 | Pollock | June 29, 1943 |

FOREIGN PATENTS

| Number | Country | Date |
|---|---|---|
| 315,012 | Germany | Oct. 23, 1919 |

OTHER REFERENCES

Bogart et al.: "Distillation of Phenolic Brines," Chemical Engineering Progress, vol. 44, pages 95–104 (February 1948).